(12) United States Patent
Subramaniam et al.

(10) Patent No.: US 10,616,981 B2
(45) Date of Patent: *Apr. 7, 2020

(54) SMART LED LIGHTING SYSTEM AND METHOD

(71) Applicant: Joule IQ, Inc., Santa Clara, CA (US)

(72) Inventors: Suresh Subramaniam, Palo Alto, CA (US); Danielle Constantino, San Jose, CA (US); Sridhar Kumar, Fremont, CA (US)

(73) Assignee: Joule IQ, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/393,178

(22) Filed: Apr. 24, 2019

(65) Prior Publication Data

US 2019/0313517 A1    Oct. 10, 2019

Related U.S. Application Data

(63) Continuation of application No. 16/140,323, filed on Sep. 24, 2018, now Pat. No. 10,321,548.

(60) Provisional application No. 62/623,310, filed on Jan. 29, 2018.

(51) Int. Cl.
*H05B 37/02* (2006.01)
*G06F 3/0484* (2013.01)
*H05B 33/08* (2020.01)

(52) U.S. Cl.
CPC ..... *H05B 37/0272* (2013.01); *G06F 3/04847* (2013.01); *H05B 33/0845* (2013.01); *H05B 33/0863* (2013.01)

(58) Field of Classification Search
CPC ............ H05B 37/0218; H05B 37/0227; H05B 37/0236; H05B 37/0245; H05B 37/0272
USPC ......................................... 315/149, 308, 312
See application file for complete search history.

(56) References Cited

U.S. PATENT DOCUMENTS

| 2013/0320862 | A1* | 12/2013 | Campbell | H05B 37/02 315/152 |
| 2014/0001959 | A1* | 1/2014 | Motley | H05B 37/02 315/149 |
| 2014/0001963 | A1* | 1/2014 | Chobot | H05B 37/02 315/153 |
| 2014/0268790 | A1* | 9/2014 | Chobot | F21V 23/0464 362/276 |

* cited by examiner

Primary Examiner — Tung X Le
(74) Attorney, Agent, or Firm — DLA Piper LLP (US)

(57) ABSTRACT

Various embodiments of a smart LED lighting system are described. The system includes a control module coupled over a wireless connection to one or more smart LED drivers, each of which controls one or more LED lighting units. The system optionally includes one or more sensors for gathering information from the surrounding environment and a gateway for establishing a wireless network and for communicating with one or more cloud computing systems. The control module can control individual lighting units, modules of individual lighting units, or zones of modules to alter the intensity, color, or character of the lighting. The control module can execute pre-programmed configurations of the lighting system to implement, for example, lighting that mimics circadian patterns or lighting that is suited for a particular event such as a meeting or a concert. The control module also can implement instructions provided by a user through a mobile device or other input device.

18 Claims, 13 Drawing Sheets

Control Signals
803

| Zone ID 1001 | Module ID 1002 | Device ID 1003 | Argument 1004 | Instruction 1005 |
|---|---|---|---|---|
| N | X | 0001 | A to B | Set brightness |
| N | X | 0001 | C to D | Set color |
| N | X | ... | ... | ... |
| N | X | N | E to F | Set color |
| N | X+1 | N+1 | G to H | Set brightness |
| N | X+1 | N+1 | I to J | Set color |
| N | X+1 | ... | | |

Module 903a
(Zone N, Module X)

SMART LED LIGHTING SYSTEM AND METHOD

PRIORITY CLAIM

This application is a continuation of U.S. patent application Ser. No. 16/140,323, filed on Sep. 24, 2018, and titled "Smart LED Lighting System and Method," which claims priority to U.S. Provisional Patent Application No. 62/623,310, filed on Jan. 29, 2018, and titled "Smart LED Method and System," both of which are incorporated by reference herein.

FIELD OF THE INVENTION

Various embodiments of a smart LED lighting system are described. The system includes a control module coupled over a wireless connection to one or more smart LED drivers, each of which controls one or more LED lighting units. The system optionally includes one or more sensors for gathering information from the surrounding environment and a gateway for establishing a wireless network and for communicating with one or more cloud computing systems. The control module can control individual lighting units, modules of individual lighting units, or zones of modules to alter the intensity, color, or character of the lighting. The control module can execute pre-programmed configurations of the lighting system to implement, for example, lighting that mimics circadian patterns or lighting that is suited for a particular event such as a meeting or a concert. The control module also can implement instructions provided by a user through a mobile device or other input device.

BACKGROUND OF THE INVENTION

Light bulb technology has changed significantly in recent years with the advent of light-emitting diode (LED) lighting and other types of lighting. However, very little progress has been made in control systems for lighting. Most commercial and residential spaces still utilize traditional light switches or dimmer switches, where a person physically moves a switch to turn a light on or off or to dim the light. Some prior art control systems utilize motion detectors that will cause a light to turn off if no motion is detected for a certain period of time. Other systems have timing controls, where a light can be automatically turned on at a specific time and turned off at another time.

In addition, prior art lighting control systems typically have required wired connections between the control unit (whether it be a switch, a dimmer switch, a motion detector, or a timing unit) and the lighting fixture. If the control system is not installed at the time a particular building is constructed, then it can take a great deal of effort and financial resources to install or change the control system at a later time, as that would require a significant renovation of the physical space.

The prior art also lacks the ability for a user or a control system to "sculpt" the light by providing control for individual LED lights. In most prior art systems, the entire set of LED lights are controlled together.

What is needed is an improved control system that can control lights individually or as a group. What is further needed is a control system that can interact with light systems in a wireless fashion. What is further needed are improved drivers for lighting systems that can implement the improved controls of the invention to allow a user or a computing device to "sculpt" the light emanating from a particular lighting device or set of devices. Such a system would create an entirely new market of lighting systems and controls for use in residential and commercial buildings.

SUMMARY OF THE INVENTION

Various embodiments of a smart LED lighting system are described. The system includes a control module coupled over a wireless connection to one or more smart LED drivers, each of which controls one or more LED lighting units. The system optionally includes a gateway for establishing a wireless network and for communicating with one or more cloud computing systems. The control module can control individual lighting units, modules of individual lighting units, or zones of modules to alter the intensity, color, or character of the lighting. The control module can execute pre-programmed configurations of the lighting system to implement, for example, lighting that mimics circadian patterns or lighting that is suited for a particular event such as a meeting or a concert. The control module also can implement instructions provided by a user through a mobile device or other input device.

Figure 1:
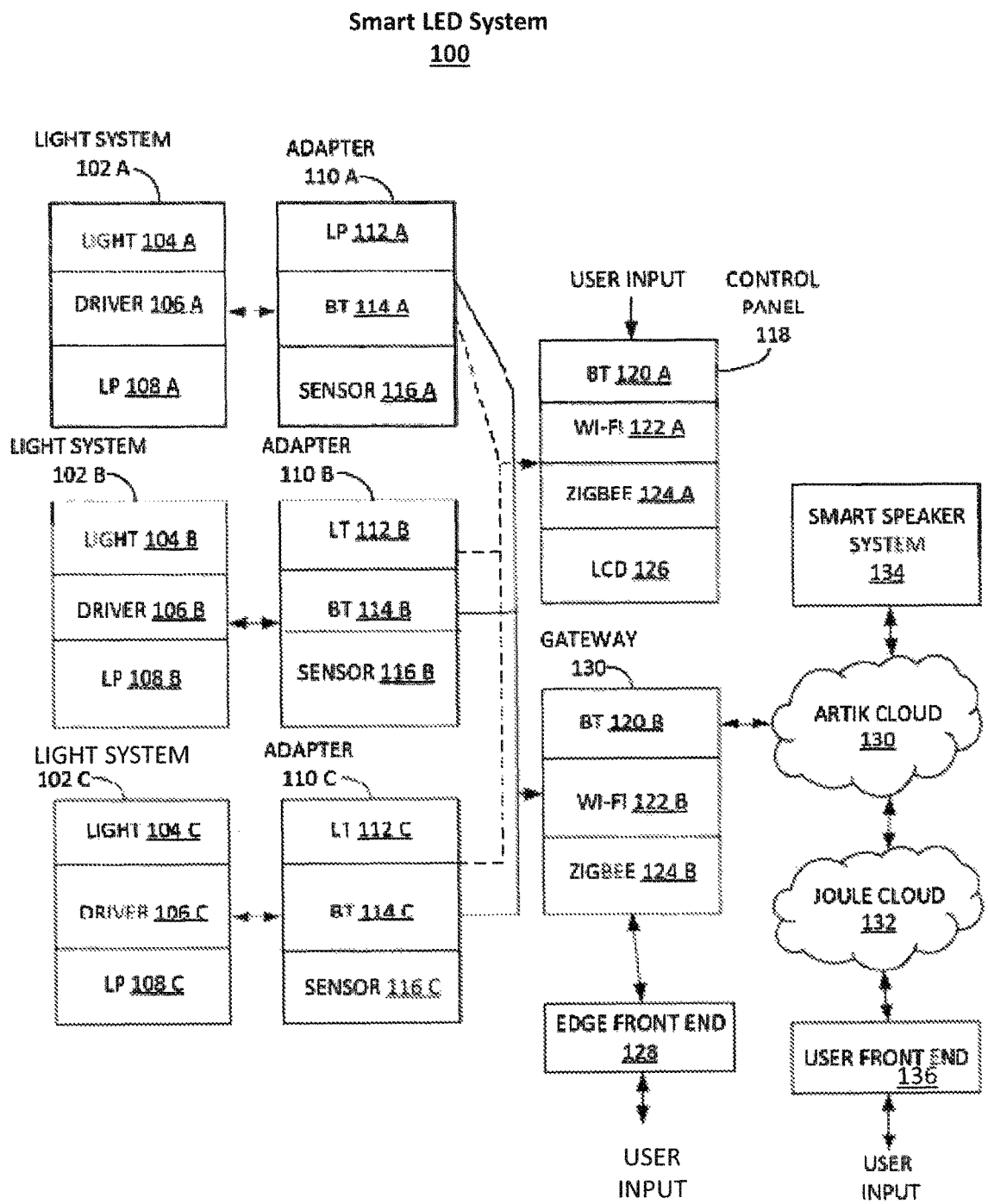
FIG. 1 depicts an embodiment of a smart LED system.

The Figures described above are a representative set and are not exhaustive with respect to embodying the invention.

DETAILED DESCRIPTION OF EMBODIMENTS OF THE INVENTION

Disclosed are systems, methods, and articles of manufacture for smart LED systems, including various embodiments of smart LED drivers and control modules.

The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," "one example," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

"AMAZON ECHO" is a trademark of a known smart speaker system. The devices within the smart speaker system connect to the voice-controlled intelligent personal assistant service known by the trademark "ALEXA."

"ARTIK" is a trademark of a known end-to-end Internet-of-Things (IoT) platform that combines hardware modules and cloud-computing services together, with built-in security and an ecosystem of tools.

A "dimmer" is a device used to alter the brightness of a light (e.g. LED, etc.). By changing the voltage waveform applied to a lighting device, it is possible to lower the intensity of the light output.

An "edge device" is a device which provides an entry point into enterprise or service provider core networks. Examples include routers, routing switches, integrated access devices (IADs), multiplexers, and a variety of metropolitan area network (MAN) and wide area network (WAN) access devices. Edge devices also provide connections into carrier and service provider networks.

"General-purpose input/output (GPIO)" is a generic pin on an integrated circuit or computer board whose behavior, including whether it is an input or output pin, is controllable by the user at run time.

"I2C (Inter-Integrated Circuit)" is a multi-master, multi-slave, packet switched, single-ended, serial computer bus.

"Internet of things (IoT)" can be the network of physical devices, vehicles, home appliances, and other items embedded with electronics, software, sensors, actuators, and network connectivity which enable these objects to connect and exchange data.

"Liquid-crystal display (LCD)" is a flat-panel display or other electronically modulated optical device that uses the light-modulating properties of liquid crystals.

A "light-emitting diodes (LED)" is a two-lead semiconductor light source. It is a p-n junction diode that emits light when activated. When a suitable voltage is applied to the leads, electrons are able to recombine with electron holes within the device, releasing energy in the form of photons. This effect is called electroluminescence, and the color of the light (corresponding to the energy of the photon) is determined by the energy band gap of the semiconductor. LEDs can be small (e.g. less than 1 mm) and integrated optical components may be used to shape the radiation pattern.

"Pulse-width modulation (PWM)" is a known modulation technique used to encode a message into a pulsing signal.

A "smart speaker" is a type of wireless speaker and voice command device with an integrated virtual assistant (artificial intelligence) that offers interactive actions and hands-free activation with the help of one 'hot word'. Some smart speakers can also act as a smart device that utilizes wireless protocols such as Wi-Fi or the protocol known by the trademark "BLUETOOTH" or other wireless protocol standards to extend usage beyond audio playback, such as to control home automation devices. This can include, but is not be limited to, features such as compatibility across a number of services and platforms, peer-to-peer connection through mesh networking, intelligent personal assistants, and others. Each can have its own designated interface and features in-house, usually launched or controlled via application or home automation software.

"Thread" is an open, IPv6-based, low-power, secure and future-proof mesh networking technology for IoT products.

"TRIAC (triode for alternating current)" is a trademark of a known three-terminal electronic component that conducts current in either direction when triggered. It is a type of bidirectional triode thyristor or bilateral triode thyristor. A thyristor is analogous to a relay in that a small voltage and current can control a much larger voltage and current.

A "virtual assistant" is a software agent that can perform tasks or services for an individual. A virtual assistant can be a chatbot. A chatbot can refer to virtual assistants generally or specifically those accessed by online chat.

"Wi-Fi" is a technology for wireless local area networking with devices based on one or more of the IEEE 802.11 standards.

"ZIGBEE" is an IEEE 802.15.4-based specification for a suite of high-level communication protocols used to create personal area networks with small, low-power digital radios, such as for home automation, medical device data collection, and other low-power low bandwidth needs, designed for small scale projects which need wireless connection. ZIGBEE is a low-power, low data rate, and close proximity (e.g. personal area) wireless ad hoc network.

A "wireless light switch" is a light switch that commands a light or home appliance to turn itself off or on, instead of interrupting the power line going to the light fixture.

Smart LED Systems

Various examples of smart LED systems and related processes will now be described.

FIG. 1 illustrates an embodiment of a smart LED system. Smart LED system 100 comprises light systems 102A, 102B, and 102C. These light systems are exemplary, and it is to be understood that smart LED system 100 can comprise a greater number or lesser number of light systems than what is shown in FIG. 1.

Light system 102A will now be described as an example. Light system 102A comprises lights 104A, smart LED driver 106A, and lighting protocol (LP) 108A. Lights 104A comprises one or more LED-based lights in various configurations (such as, for example, a string of LEDs). Smart LED driver 106A provides power to lights 104A and can control the lights therein through the voltage and/or current provided to lights 104A. LP 108A enables control of smart LED driver 106A. For example, LP 108A enables control of lights 104A to an off state, on state, or any dim state between on and off. Light system 102A optionally can be included in a physical fixture.

Light system 102B comprises lights 104B, smart LED driver 106B, and LP 108B, and light system 104C comprises lights 104C, smart LED driver 106C, and LP 108C. Light systems 102B and 102C and the components thereof operate in the same way as light system 102A and its components, and a description of their operation will not be repeated here.

Smart LED system 100 can further comprise adapters 110A, 110B, and 110C, each of which is coupled to one of light systems 102A, 102B, and 102C. These adapters are exemplary, and it is to be understood that smart LED system 100 can comprise a greater number or lesser number of adapters (and associated light systems) than what is shown in FIG. 1.

Adapter 110A will now be described as an example. Adapter comprises LP 112A, wireless interface 114A, and sensor 116A. LP 112A can communicate with other LPs (such as LP 108A) and/or smart LED drivers (such as smart LED driver 106A). Wireless adapters 114A is a wireless interface that enables wireless communication. Wireless adapter 114A in one embodiment follows the wireless protocol known by the trademark BLUETOOTH, here also referred to as BT. Sensor 116A can detect characteristics of the surrounding environment, and can comprise for example, a temperature sensor, chemical sensor, smoke sensor, air pressure sensor, sound sensor, light sensor, or other sensor. Adapter 110A can receive instructions from control panel 118 and/or gateway 130, discussed below. Optionally, adapter 110A and light system 102A can be combined together in one single physical device.

Adapter 110B comprises LP 112B, wireless interface 114B, and sensor 116B, and adapter 110C comprises LP 112C, wireless interface 114C, and sensor 116C. Adapters 110B and 110C and the components thereof operate in the same way as adapter 110A and its components, and a description of their operation will not be repeated here.

Smart LED system 100 further comprises control panel 118. Control panel 118 can include various wireless network interfaces for communicating with adapters 110A, 110B, and 110C. For example, control panel 118 can comprise wireless interface 120A that implements the wireless protocol known by the trademark BLUETOOTH; wireless interface 122A that implements the wireless protocol known as Wi-Fi or 802.11; wireless interface 124A that implements the wireless protocol known by the trademark ZIGBEE; and wireless interfaces that implement other wireless protocols. Control panel 118 can further comprise LCD display 126 for user control and interaction, such as through user interface 900 shown in FIG. 9.

Smart LED system 100 can further comprise gateway 130. Gateway 130 can include various wireless network interfaces for establishing a wireless network and/or communicating with control panel 118, adapters 110A, 110B, and 110C, and other devices. For example, gateway 130 can comprise wireless interface 120B that implements the wireless protocol known by the trademark BLUETOOTH; wireless interface 122B that implements the wireless protocol known as Wi-Fi or 802.11; wireless interface 124C that implements the wireless protocol known by the trademark ZIGBEE; and wireless interfaces that implement other wireless protocols. Gateway 130 is able to communicate with various cloud-platform based entities, such as cloud computing systems 130 and 132, and with edge front end 128 and user front end 136, discussed below, over wired (such as Ethernet) and/or wireless interfaces and networks. In this way, smart LED applications in a user-side computing device (e.g. a mobile device, tablet computer, personal computer, laptop, smart watch, smart speaker system 134, etc.) can be used to control the state of lights 104A, 104B, and 104C.

Figure 9:
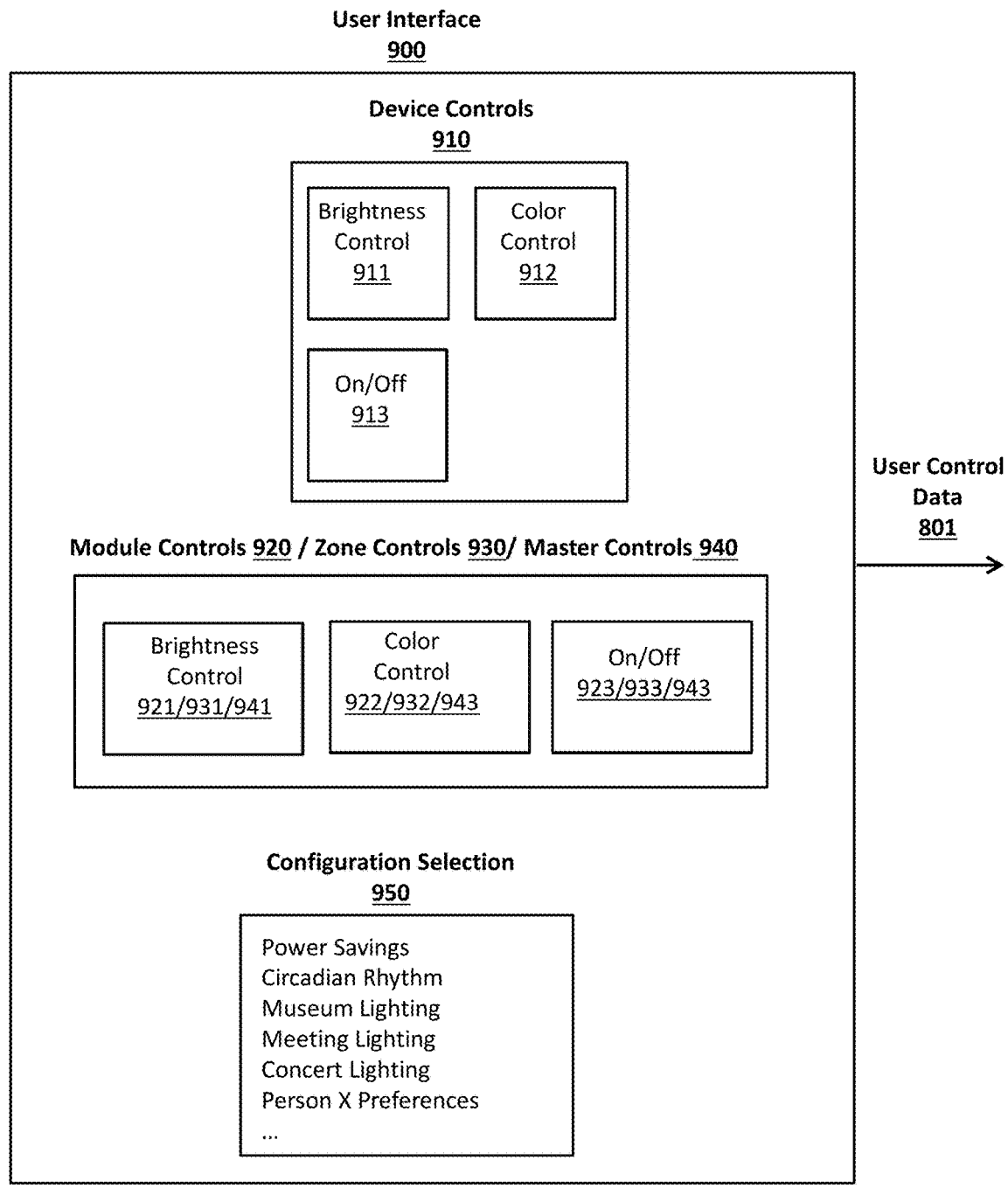
FIG. 9 depicts an embodiment of a user interface to obtain one or more instructions from a user and to generate user control data for use by the smart LED control module of FIG. 8.

Edge front end 128 can receive user input regarding a desired state of Smart LED system 100 (e.g. LED lights on, LED lights off, intensity of LED lights, etc.), such as through user interface 900 shown in FIG. 9. Edge front end 120 optionally comprises a computing device, such as computing system 400 shown in FIG. 4. Edge front end 128 can interface with gateway 130.

User front end 136 can receive user input regarding a desired state of Smart LED system 100. User front end 136 can access smart LED system 100 via various cloud-computing platforms (e.g. 130 and 132, etc.).

Smart speaker system 134 can receive user voice input regarding a desired state of smart LED system 100 and can provide these instructions through cloud computing systems 130 and 132, gateway 130, control panel 118, or adapters 110A, 110B, and 110C.

A user can use smart LED system 100 to interact with a smart LED software application (such as smart LED control module 800 in FIG. 8) to dim, turn on, or turn off lights 104A, 104B, and 104C. Multiple applications can be available for user input depending on the user's location and available computing systems.

In one embodiment, a user can control smart LED system 100 by providing a voice instruction to smart speaker system 134. For example, a user can say "turn down the light," and smart speaker system 134 then can receive this user voice input and generate and send a control instruction via cloud computing system 130 to gateway 130. Gateway 130 can then wirelessly communicate with adapters 110A, 110B, or 110C to implement the control instruction by leveraging the local lighting protocol 108A, 108B, or 108C for the relevant light system 102A, 102B, or 102C.

Figure 2:
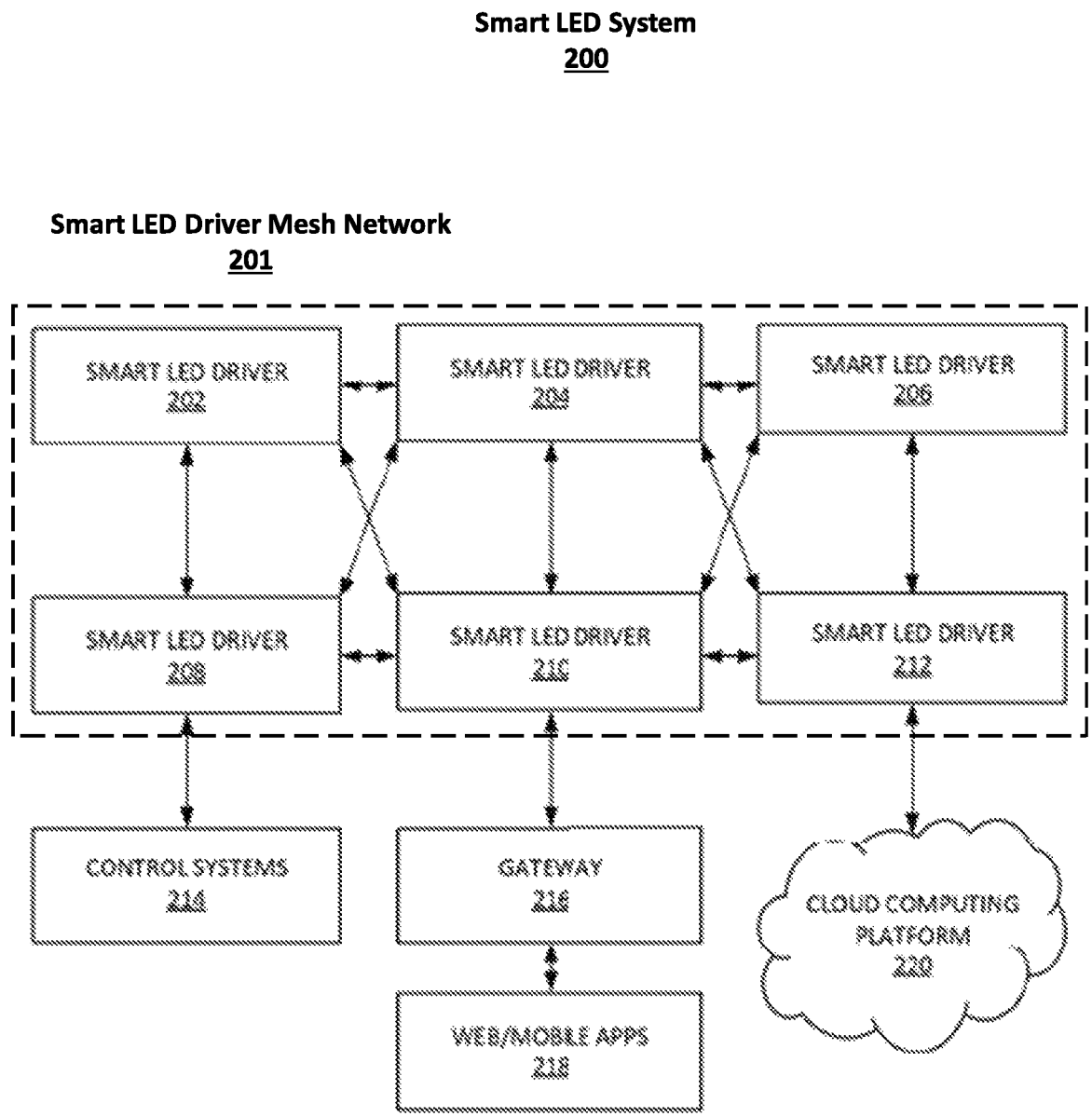
FIG. 2 depicts an embodiment of a smart LED system that includes a smart LED driver mesh network.

FIG. 2 illustrates another embodiment of a smart LED system. Smart LED system 200 comprises smart LED driver mesh network 201, whereby smart LED drivers 202, 204, 206, 208, 210, and 212 form a mesh network, which is a network topology known to those of ordinary skill in the art. Here, smart LED drivers 202, 204, 206, 208, 210, and 212 can perform the same functions as smart LED drivers 106A, 106B, and 106C in FIG. 1, with the added function of forming a mesh network. Similarly, control system 214 can perform the same functions as control panel 118 in FIG. 1, and gateway 216 can perform the same functions as gateway 130 in FIG. 1.

Smart LED driver mesh network 201 can receive control instructions from control system 214, gateway 216 and/or cloud-platform based entities 220. User-side applications can provide user instructions for the state of a light system controlled by a smart LED driver via web/mobile applications 218 (which is an example of edge front end 129 or user front end 136 in FIG. 1). In the example shown, smart LED adapters (such as smart LED adapters 110A, 110B, and 110C in FIG. 1) have been integrated with smart LED drivers 202, 204, 206, 208, 210, and 212.

Figure 3:
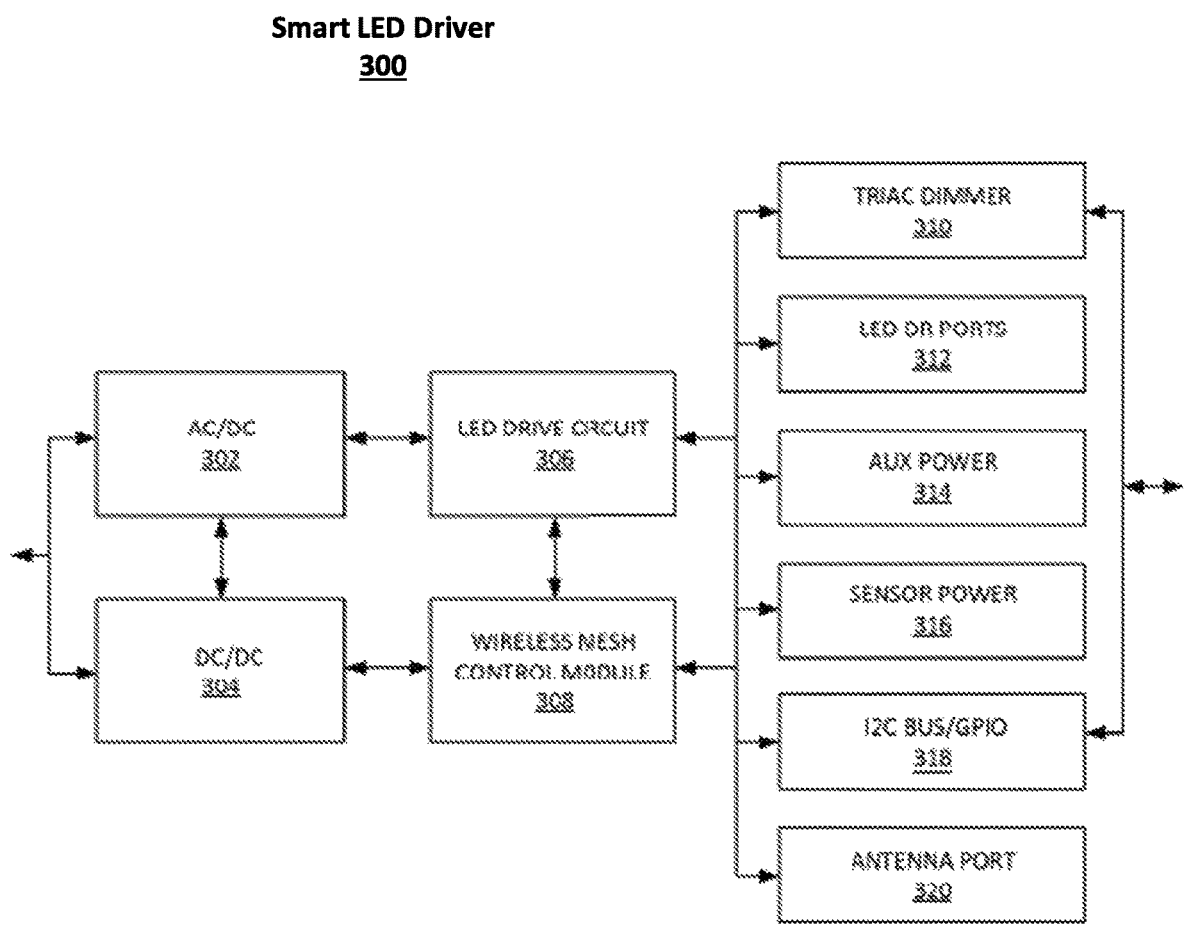
FIG. 3 depicts an embodiment of a smart LED driver.

FIG. 3 illustrates further detail of an embodiment of a smart LED driver. Smart LED driver 300 can be used to implement smart LED drivers 106A, 106B, and 106C in FIG. 1 and smart LED drivers 202, 204, 206, 208, 210, and 212 in FIG. 2. Smart LED driver 300 can include a power source (e.g. AC/DC power source 302, DC/DC power source 304, etc.) that can convert an external power AC or DC signal to a lower DC voltage appropriate for the circuits of the smart LED light. Smart LED drive circuit 306 can drive one or more LEDs (including a set of strings of LEDs), such as lights 104A, 104B, and 104C. Wireless mesh control module 308 can control LED drive circuit 306. Wireless mesh control module 308 can implement PWM control, 0-10 volt dimming, multiple channels, etc. For example, wireless mesh control module 308 can implement voltage control known by the trademark "DOLBY DMX" 0-10V. Smart LED driver 300 can implement various wireless mesh protocols, such as Wi-Fi or the protocols known by the trademarks BLUETOOTH or THREAD. Using such controls, the output power of smart LED driver 300 can be changed and is programmable.

LED drive circuit 306 is coupled to TRIAC dimmer 310, smart LED drive ports 312, auxiliary power 314, sensor power 316, I2C bus or GPIO bus 318, and antenna port 320.

TRIAC dimmer module 310 can implement dimming of external LED lights. TRIAC dimmer module 310 can be three-terminal electronic component that conducts current in either direction when triggered.

Smart LED drive ports 312 can drive external LED lights.

AUX power 314 can enable the connection of additional external circuits to obtain power from LED circuits.

Sensor power module 316 can enable various external sensor system(s) to be connected to smart LED driver 300 and be powered. The sensor power can be programmable.

I2C Bus/GPIO 318 can enable query external sensors(s) to obtain sensor status data. I2C Bus/GPIO 318 can communicate sensor status data to a gateway (e.g. gateway 130) and/or an appropriate cloud-computing entity. I2C Bus/GPIO 318 can include at least one to N I2C buses, buses, or other buses (where N is an integer).

In this way, the functionality of smart LED drive circuit 306 is enhanced beyond just control of smart LED lights. Sensors can be used for environmental monitoring (e.g., using temperature sensors, pressure sensors, volatile gas detectors, microphones, digital cameras, etc.), security systems, etc. Buses 318 can enable general purpose control functions.

In some examples, smart LED driver 300 can be embedded inside a metal case. Accordingly, antenna port 320 can be external to the metal case to improve wireless signal quality without changes methods of building LED/light fixtures.

Smart LED driver 300 can enable controlling smart LED lights remotely. Smart LED driver 300 can be implemented without the installation of separate hardware systems while maintaining the "look and feel" of traditional LED lights. Additional external functionalities can be added to the smart LED driver 300.

Figure 5:
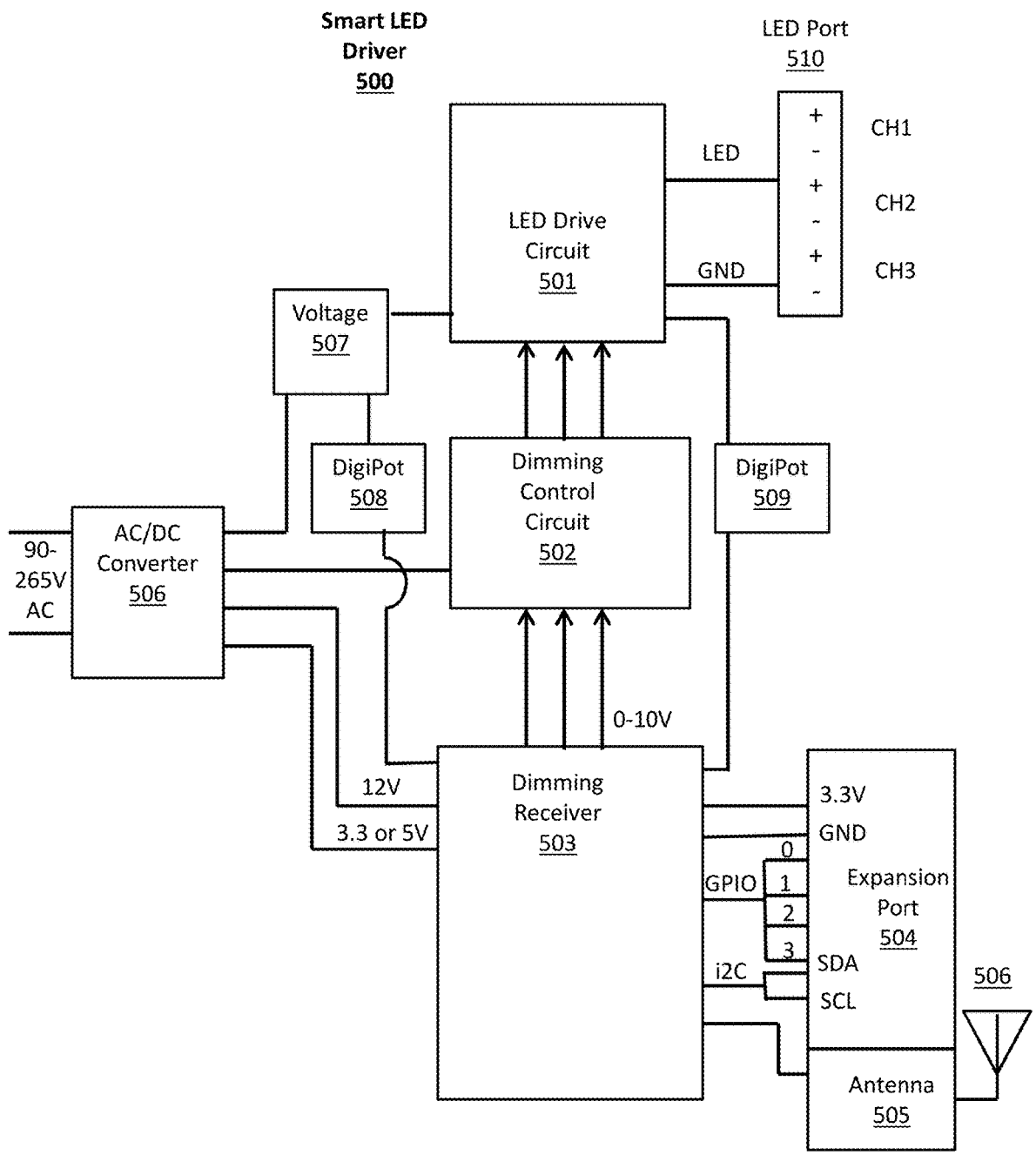
FIG. 5 depicts additional detail of an embodiment of a smart LED driver.

FIG. 5 depicts additional details of an embodiment of a smart LED driver. Smart LED driver 500 is one implementation of smart LED drivers 106A, 106B, 106C, 202, 204, 206, 208, 210, 212, and 300 in FIGS. 1-3.

Smart LED driver system 500 comprises LED drive circuit 501, dimming control circuit 502, dimming receiver 503, expansion port 504, antenna port 505, AC/DC converter 506, DC voltage source 507, digital potentiometers 508 and 509, and LED port 510.

AC/DC converter 506 is a power adapter for converting AC electricity (typically between 90-265V) into various DC voltages, such as 3.3V, 5V, and 12V. DC voltage source 507 provides voltage to LED driver 501 with sufficient power to provide the requisite voltages to the LED lights coupled to LED driver 501. LED drive circuit 501 can drive one or more LEDs (including LED strings) attached to on LED port 510 on up to three separate channels (labeled CH1, CH2, and CH3). Optionally, the usage of one channel (e.g., CH1) can implement dimming, the usage of two channels (e.g., CH1 and CH2) can implement dimming and color temperature control, and the usage of three channels (e.g., CH1, CH2, and CH3) can implement RGB lighting and various color mixtures using the RGB lighting.

Dimming control circuit 502 can level translate an input of 0-10V received from dimming receiver 503 to a level used by LED drive circuit 501. Dimming control circuit 502 can support up to three channels, to control each of the three channels output by LED driver 501. Dimming receiver 503 can receive a control signal or instructions from a user device (such as control signals 803 in FIG. 8) over a wireless protocol and outputs a 0-10V output value to dimming control circuit 502.

Digital potentiometers 508 and 509 can enable modification of the setting of current or voltage in smart LED drive circuit 501 (e.g. 100 watts, 25 watts, 100 milliamps, 1.5 amps, etc.). Digital potentiometers 508 and 509 enable the digital control of output voltage and power.

Expansion port 504 can be used to provide auxiliary power (e.g. 0.5 to 1 amp, etc.) to a device external to smart LED driver 500. Smart LED driver 500 can include up to M general purpose LED lights (where M is an integer).

Smart LED driver 500 can include one or more I2C buses and one or more GPIO buses.

Antenna port 505 connects to antenna 506 for use in wireless communication. Antenna port 505 optionally can be designed into the body of smart LED driver 500.

Figure 6:
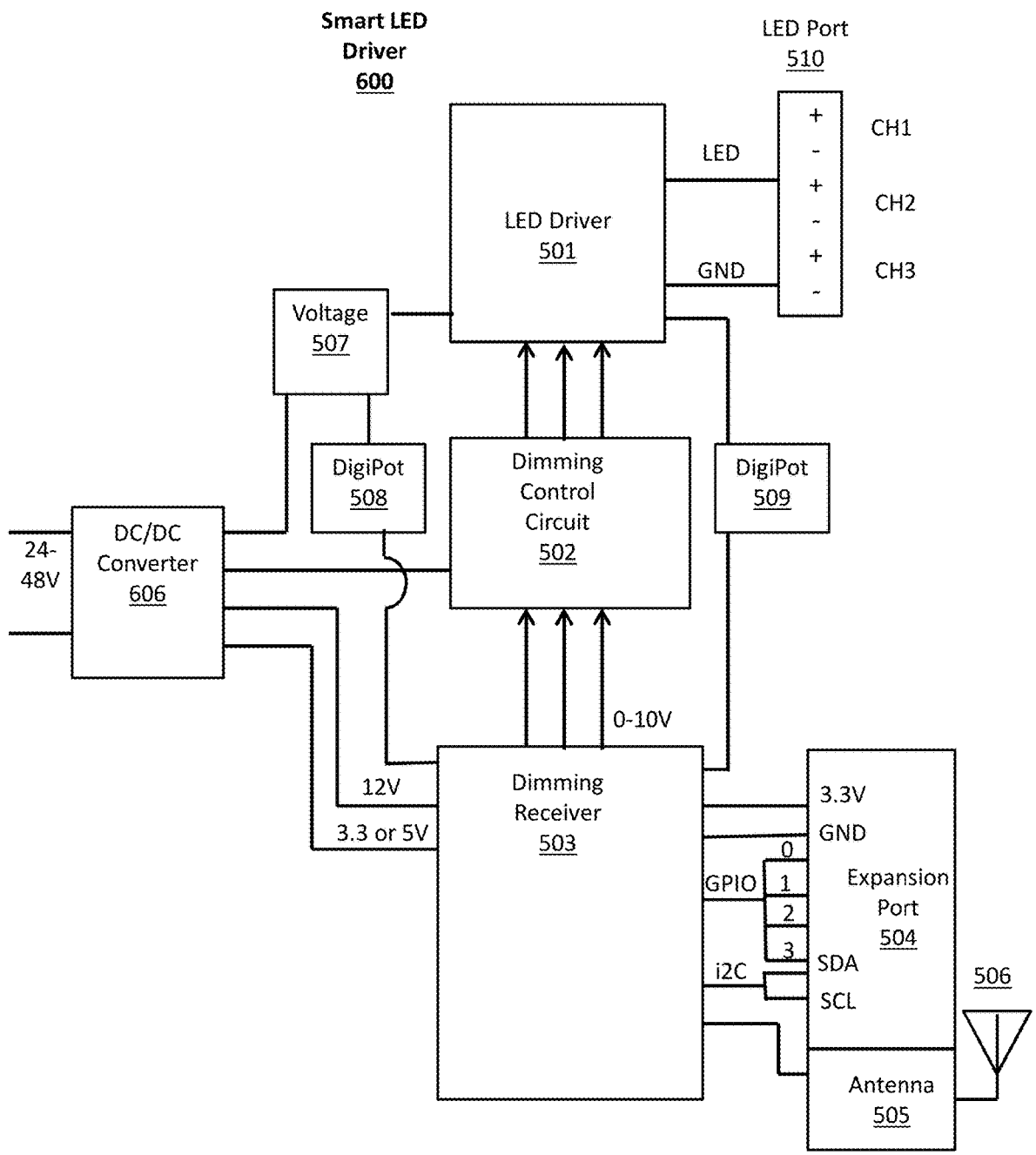
FIG. 6 depicts additional detail of another embodiment of a smart LED driver.

FIG. 6 depicts smart LED driver 600. Smart LED driver 600 is one implementation of smart LED drivers 106A, 106B, 106C, 202, 204, 206, 208, 210, 212, and 300 in FIGS. 1-3. Smart LED driver system 600 is the same as smart LED driver system 500 except that AC/DC converter 506 is replaced with DC/DC converter 606. DC/DC converter 506 is a power adapter for converting high voltage DC (such as 24V-48V) into various DC voltages, such as 3.3V, 5V, and 12V, used by the smart LED system.

Figure 7:
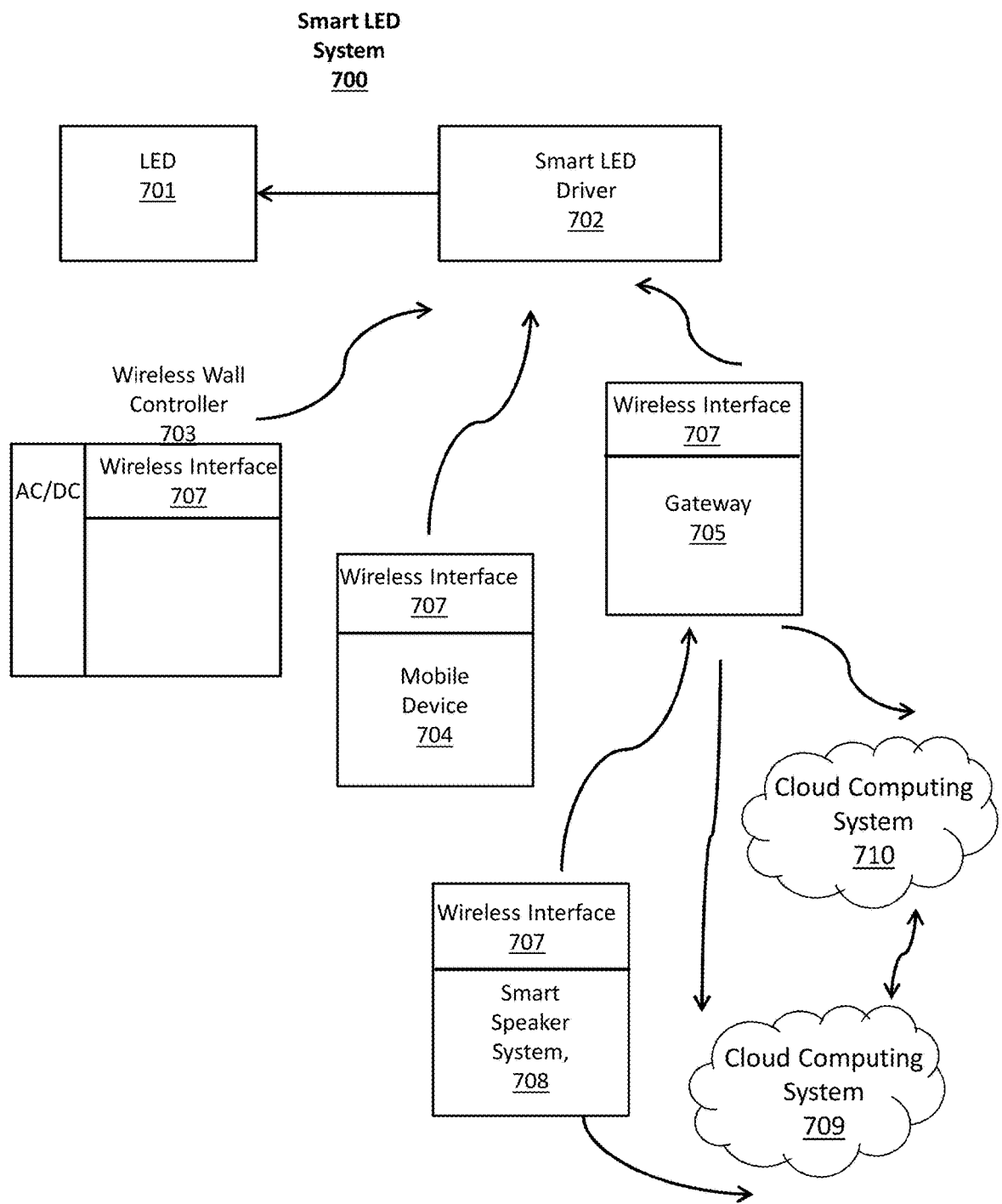
FIG. 7 depicts additional detail of a smart LED system.

FIG. 7 depicts additional aspects of an embodiment of a smart LED system. Smart LED system 700 is shown as an example and can be used for smart LED system in FIG. 1 and smart LED system 200 in FIG. 2. Smart LED system 700 comprises smart LED driver 702 (which is an example of smart LED drivers 106A, 106B, and 106C in FIG. 1; smart LED drivers 202, 204, 206, 208, 210, and 212 in FIG. 2; smart LED driver 300 in FIG. 3; smart LED driver 500 in FIG. 5; and smart LED driver 600 in FIG. 6). Smart LED system 700 comprises wall-mounted controller 703. Wall-mounted controller 703 (which is an example of control panel 118 in FIG. 1) can directly control the light values of LED 701 over a wired or wireless connection. Wall-mounted controller 703 can include up to three dimming channels to control the three channels of smart LED drivers 500 and 600 of FIG. 5 or 6, for example.

Smart LED system 700 can further comprise wireless gateway 705 (which is an example of gateway 130 in FIG. 1 and gateway 216 in FIG. 2). Wireless gateway 705 can communicate with cloud computing systems such as cloud computing systems 709 and 710 (which are example of cloud computing systems 130 and 132 in FIG. 1 and cloud computing system 220 in FIG. 2) using APIs or other known mechanisms. Wireless gateway 705 also can communicate with smart speaker system 708 (which is an example of smart speaker system 134 in FIG. 1), such as the smart speaker system known by the trademark ALEXA. Wireless gateway 705 can communicate with multiple adapters in a smart LED system, such as adapters 110A, 110B, and 110C in FIG. 1 or smart driver 702 (which contains a built-in adapter).

Optionally, smart LED driver 702 also can communicate directly with mobile device 704 (such as a mobile phone or tablet) running a software application.

Here, wireless wall controller 703, mobile device 704, wireless gateway 705, and voice-controlled device 708 each comprise wireless interface 707, which can be an interface that implements any known wireless communication, such as Wi-Fi, 3G, 4G, 5G, or the wireless protocols known by the trademarks BLUETOOTH and ZIGBEE.

Figure 4:
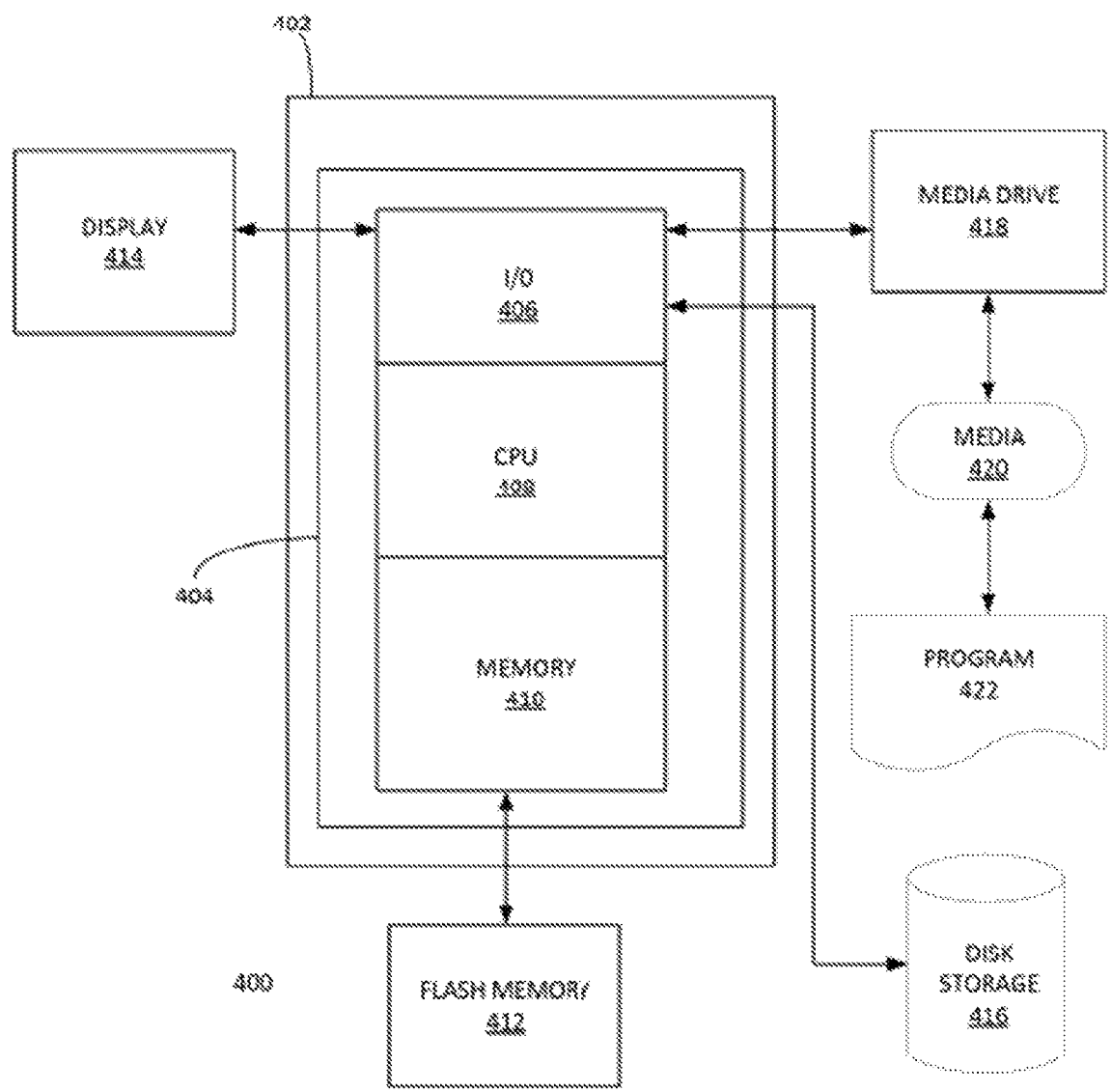
FIG. 4 depicts hardware and software components for implementing various aspects of the smart LED system described herein.

FIG. 4 depicts an exemplary computing system 400 that can be configured to perform any one of the processes provided herein. In this context, computing system 400 may include, for example, a processor, memory, storage, and I/O devices (e.g., monitor, keyboard, disk drive, Internet connection, etc.). However, computing system 400 may include circuitry or other specialized hardware for carrying out some or all aspects of the processes. In some operational settings, computing system 400 may be configured as a system that includes one or more units, each of which is configured to carry out some aspects of the processes either in software, hardware, or some combination thereof.

In the example of FIG. 4, computing system 400 comprises motherboard 404 comprising input-output (I/O) module 406, one or more central processing units (CPU) 408, and memory module 410, which may include an external flash memory card 412. I/O module 406 can be connected to display 414, a keyboard (not shown), and/or other user input (not shown), disk storage unit 416, and media drive 418. Media drive unit 418 can read/write a computer-readable medium 420, which can contain programs 422 and/or data.

Computing system 400 can include an operating system and web browser. Moreover, it is noted that computing system 400 can be configured to include additional systems in order to fulfill various functionalities. Computing system 400 can communicate with other computing devices based on various computer communication protocols such a Wi-Fi, the wireless protocols known by the trademarks BLUETOOTH and ZIGBEE, other standards for exchanging data over short distances includes those using short-wavelength radio transmissions, USB, Ethernet, cellular, an ultrasonic local area communication protocol, etc.

Computing system 400 optionally can be used (in whole or in part) within control panel 118, gateway 130, edge front end 129, smart speaker system 134, cloud computing systems 130 and 132, user front end 136, control system 214, gateway 216, applications 218, cloud computing system 220, and any other device described herein that requires instructions to be executed by a CPU or requires the use of a software application.

Figure 8:
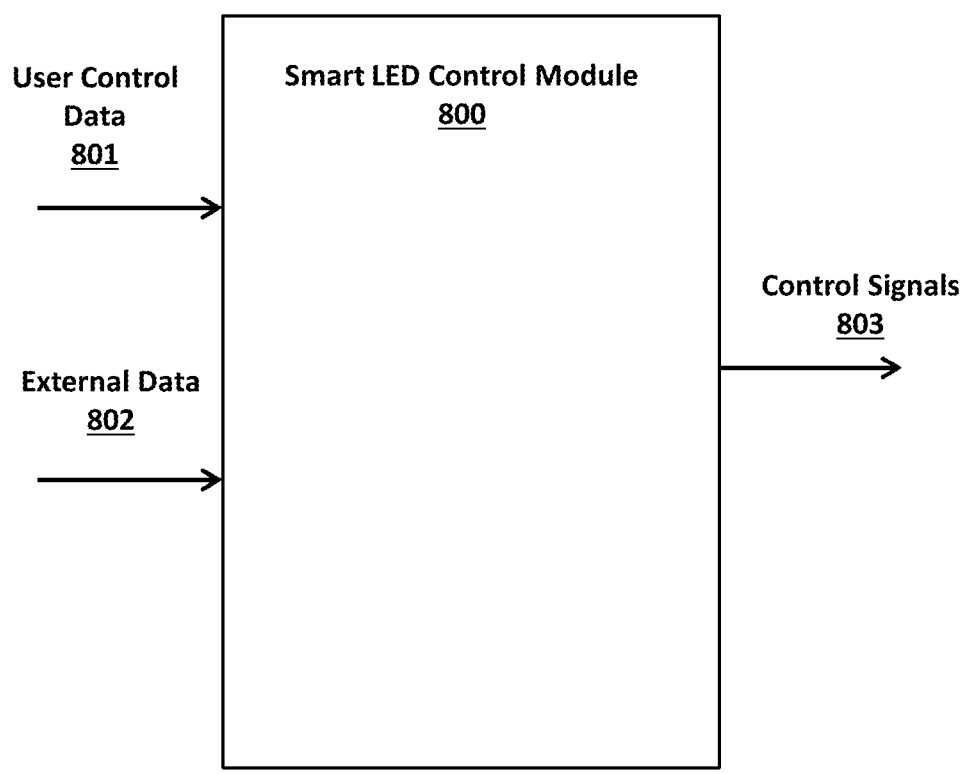
FIG. 8 depicts a smart LED control module.

FIG. 8 depicts smart LED control module 800. In one embodiment, smart LED control module comprises software executing on CPU 408 within computing system 400, and can be executed within control panel 118, gateway 130, edge front end 128, user front end 136, smart speaker system 134, cloud computing systems 130 and 132, control system 214, gateway 216, web/mobile apps 218, cloud computing system 220, wireless wall controller 703, mobile device 704, gateway 705, smart speaker system 708, cloud computing systems 709 and 710, or any other computing device used in conjunction with the embodiments described herein.

Smart LED control module 800 receives user control data 801 and external data 802 and generates control signals 803.

Figure 11:
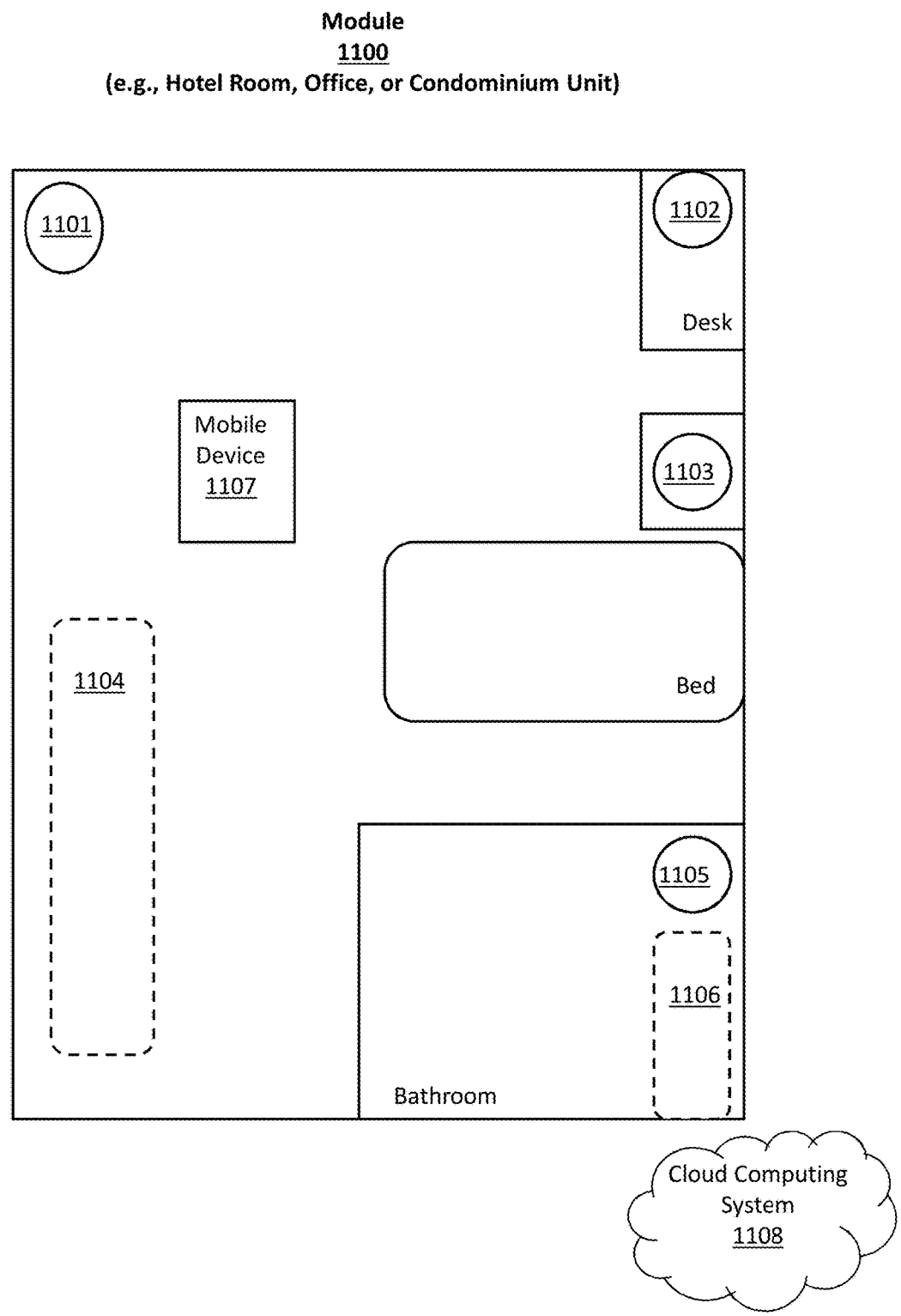
FIG. 11 depicts an embodiment of a module of LED lighting systems.

User control data 801 can be received from any input device from which a user can issue instructions or preferences to be implemented in a smart LED system, such as edge front end 128, user front end 136, control panel 118, smart speaker system 134 in FIG. 1; control system 214, web/mobile apps 218, and cloud computing system 220 in FIG. 2; wireless wall controller 703, mobile device 704, smart speaker system 708, and cloud computing systems 709 and 710 in FIG. 7; user interface 900 in FIG. 9; and mobile device 1107 in FIG. 11.

External data 802 can be received from any source other than a user, such as from cloud computing systems 130 and 132 in FIG. 1; cloud computing system 220 in FIG. 2; and clouding computing systems 709 and 710 in FIG. 7.

Smart LED control module 800 generates control signals 803, which in turn are provided to the smart LED drivers and adapters described herein, such as smart LED drivers 106A, 106B, and 106C and adapters 110A, 110B, and 110C in FIG. 1; smart LED drivers 202, 204, 206, 208, 210, and 212 in FIG. 2; smart LED driver 300 in FIG. 3; smart LED driver 500 in FIG. 5; smart LED driver 600 in FIG. 6; smart LED driver 702 in FIG. 7; and smart LED drivers 901a, . . . , 901i in FIG. 9. As discussed in greater detail below with reference to FIGS. 10A and 10B, control signals 803 can comprise digital data sent over a wireless communication protocol, where the digital data comprises configuration data for one or more light devices, modules, or zones.

Exemplary user interface 900 is depicted in FIG. 9. User interface 900 might be used on any visual input device from which a user can issue instructions or preferences to be implemented in a smart LED system, such as edge front end 128, user front end 136, and control panel 118 in FIG. 1; control system 214, web/mobile apps 218, and cloud computing system 220 in FIG. 2; wireless wall controller 703, mobile device 704, and cloud computing systems 709 and 710 in FIG. 7; and mobile device 1107 in FIG. 11.

User interface 900 optionally provides device controls 910 for each LED light in the particular LED system. Device controls 910 provides input devices (such as up and down arrows, text boxes, dials, sliding scales, etc.) for brightness control 911, color control 912, and on/off 913 for each device. Here, only one instantiation of device controls 910 is shown, but it is to be understood that a different instantiation can be provided each device in the system. In the alternative, device controls 910 can include a mechanism to specify which device is being controlled/configured through the displayed device controls 910 at a particular time.

Similarly, user interface 900 also provides module controls 920 for each module, zone controls 930 for each zone, and master controls 940 for the entirety of the LED system. Module controls 920 provide input devices (such as up and down arrows, text boxes, dials, sliding scales, etc.) for brightness control 921*a*, color control 922, and on/off 923 for each module to control all devices simultaneously within a particular module. Here, only one instantiation of module controls 920 is shown, but it is to be understood that a different instantiation can be provided each module in the system. In the alternative, module controls 920 can include a mechanism to specify which module is being controlled/configured through the displayed module controls 920 at a particular time.

Zone controls 930 provides input devices (such as up and down arrows, text boxes, dials, sliding scales, etc.) for brightness control 931, color control 932, and on/off 933 to control all devices simultaneously within a particular zone. Here, only one instantiation of zone controls 930 is shown, but it is to be understood that a different instantiation can be provided each zone in the system. In the alternative, zone controls 930 can include a mechanism to specify which zone is being controlled/configured through the displayed zone controls 930 at a particular time.

Master controls 940 provides input devices (such as up and down arrows, text boxes, dials, sliding scales, etc.) for brightness control 941, color control 942, and on/off 943 to control all devices simultaneously in the entire system.

User interface 900 also includes input controls for configuration selection 950. Here, the user can instruct LED system to implement pre-existing configurations, discussed in greater detail in Table 1:

TABLE 1

EXEMPLARY OPTIONS AVAILABLE UNDER CONFIGURATION SELECTION 950

| Configuration Name | Description | Implementation Details |
| --- | --- | --- |
| Power Savings | Minimize power consumption. | Various ways exist to increase power savings. For example, all lights can be dimmed. Or, light can be dimmed in modules and zones which are known to be occupied by fewer persons. Or, lights can be turned off or dimmed if motion sensors do not detect movement within the past T seconds. |
| Circadian Rhythm | Mimic natural sunlight throughout the day. | Brightness and color of lighting will change during the day to mimic natural sunshine. |
| Museum Lighting | Relatively dim lighting to minimize glare. | Brightness will be relatively low. |
| Meeting Lighting | Relatively bright lighting to facilitate the reading of documents. | Brightness will be relatively high. |
| Concert Lighting | Extremely dim lighting to allow people to concentrate on the performer on stage. | Brightness will be extremely low. |
| Person X Preferences | Preferences previously specified by Person X. | The system will remember the preferences of Person X. For example, Person X may prefer bright lights in the morning and dimmer lights in the afternoon. |

A particular configuration selected within configuration selection 950 can be implemented using two different architectures. In one architecture, smart LED control module 800 transmits control signals to control each zone, module, or device to alter specific characteristics of each item (e.g., brightness) based on the configuration selected. In a second architecture, smart LED control module 800 transmits control signals that indicate the specific configuration to be implemented, and each device that receives the control signal is able to alter its own characteristic based on configuration data stored within the device for that specific configuration. Each device might store this information, for example, as part of a lighting protocol (LP), such as LP 108A, 108B, 108C, 112A, 112B, and 112C in FIG. 1.

Figures 10A, 10B:
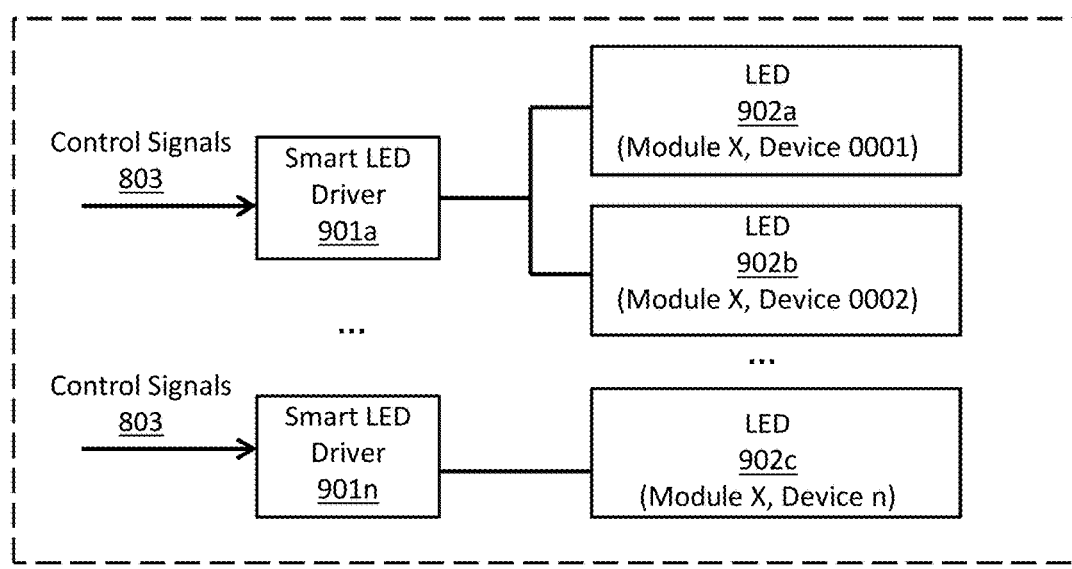
FIG. 10A depicts additional detail regarding an embodiment of control signals for use by the smart LED control module of FIG. 8.
FIG. 10B depicts control signals being provided to exemplary smart LED drivers.

FIGS. 10A and 10B contain additional detail regarding control signals 803. FIG. 10A depicts an example of functions that can be performed through the use of control signals 803. For example, control signals 803 can include Zone ID 1001 (to identify the zone pertaining to an instruction), Module ID 1002 (to identify the module pertaining to an instruction), Device ID 1003 (to identify the device pertaining to an instruction), Argument 1004 (to provide one or more values or ranges of values associated with instruction 1005), and instruction 1005 (such as "set brightness" or "set color.").

In one embodiment, zone ID 1001 is eight bits (allowing for up to 256 zones), module ID 1002 is eight bits, (allowing for up to 256 modules per zone), device ID 1003 is eight bits (allowing for up to 256 devices per module), argument 1004 is six bits (allowing for up to 1024 different values, combination of values, or ranges of values for each instruction), and instruction 1005 is eight bits (allowing for up to 256 different instructions). These bit sizes are merely exemplary, and any number of bits can be used for each of zone ID 1001, module ID 1002, device ID 1003, argument 1004, and instruction 1005.

An exemplary instruction set listing possible instructions for instruction 1005 are shown in Table 2:

TABLE 2

EXEMPLARY INSTRUCTION SET FOR INTRUCTION 1005

| Bit Code for Instruction 1005 (8-Bit Example) | Description of Instruction |
| --- | --- |
| 00000000 | Set brightness, where Argument 1004 is a brightness level. |
| 00000001 | Set color, where Argument 1004 is a color value. |
| 00000010 | Establish timer, where Argument 1004 indicates a start time and an end time or duration. |

TABLE 2-continued

EXEMPLARY INSTRUCTION SET FOR INTRUCTION 1005

| Bit Code for Instruction 1005 (8-Bit Example) | Description of Instruction |
|---|---|
| 00000011 | Establish frequency of blinking, where Argument 1004 is a frequency of blinking. |
| 00000100 | Establish lumens threshold, where Argument 1004 is a "not to exceed" threshold for the total lumens sensed by a local sensor, whereby the light would be adjusted based on the amount of natural light that is present. |
| 00000101 | Command to report power consumption, where Argument 1004 is null. |
| 00000110 | Command to test LED faults, where Argument 1004 is null. |
| 00000111 | Recalibrate dimming curve based on LED data, where Argument 1004 contains variables or coefficients for the dimming curve (e.g., x, y, Y). |
| 00001000 | Set dimming algorithm (linear, log, exponential, etc.), where Argument 1004 indicates the algorithm to be implemented. |
| 00001001 | Set ramp rate, where Argument 1004 indicates the rate at which the brightness should ramp upward or downward. |
| 00001010 | Set mode of operation (e.g., white tuning, solo, dual, etc.), where Argument 1004 indicates the mode., instructions to change mode of operation. |
| 00001011 | Set step size, where Argument 1004 indicates the magnitude of the step size. |
| 00001111 | Command to optimize network for high reliability and availability, where Argument 1004 is null. |
| 00010000 | . . . |
| . . . | . . . |

FIG. 10B depicts an example of control signals 803 being received by smart LED drivers 901a, . . . , 901n for the n devices in the system. Smart LED driver 901a identifies the instructions 1005 that are intended for its attached devices (LED 902a and 902b) and controls its attached devices as indicated by instructions 1005. Each of the other smart LED drivers 901b, . . . 901n does the same for its attached devices.

Thus, it can be seen that control signals 803 can be used to control each individual device, all devices contained within a module, all devices contained within a zone, or all devices in the entire system.

FIG. 11 depicts one embodiment of module control. Here, module 1100 corresponds to an individual hotel room, office, condominium unit, or other defined space. Module 1100 comprises LED devices 1101, 1102, 1103, 1104, 1105, and 1106. The user who enters this physical space is carrying mobile device 1107. Using user interface 900 or other input controls, the user can alter the brightness, on/off status, and color of LED devices 1101, 1102, 1103, 1104, 1105, and 1106, either through individual device adjustment or module adjustment. Optionally, mobile device 1107 or cloud computing device 1108 (e.g., the hotel's server) can store that user's preferences and automatically adjust the devices in a room according to those preferences when the user next enters that physical space again or a similar space.

In another embodiment, mobile device 1107 might cause a user's preferences to be implemented when mobile device 1107 is sensed by any of the wireless interfaces within module 1100, such as through a handshaking technique that naturally occurs in wireless protocols such as Wi-Fi or the protocol known by the trademark BLUETOOTH. Thus, when the user walks into the room holding mobile device 1107, that person's preferences will be automatically implemented. When mobile device 1107 is no longer sensed (such as when the user leaves the room), module 1100 can revert to default or power saving settings.

Figure 12:
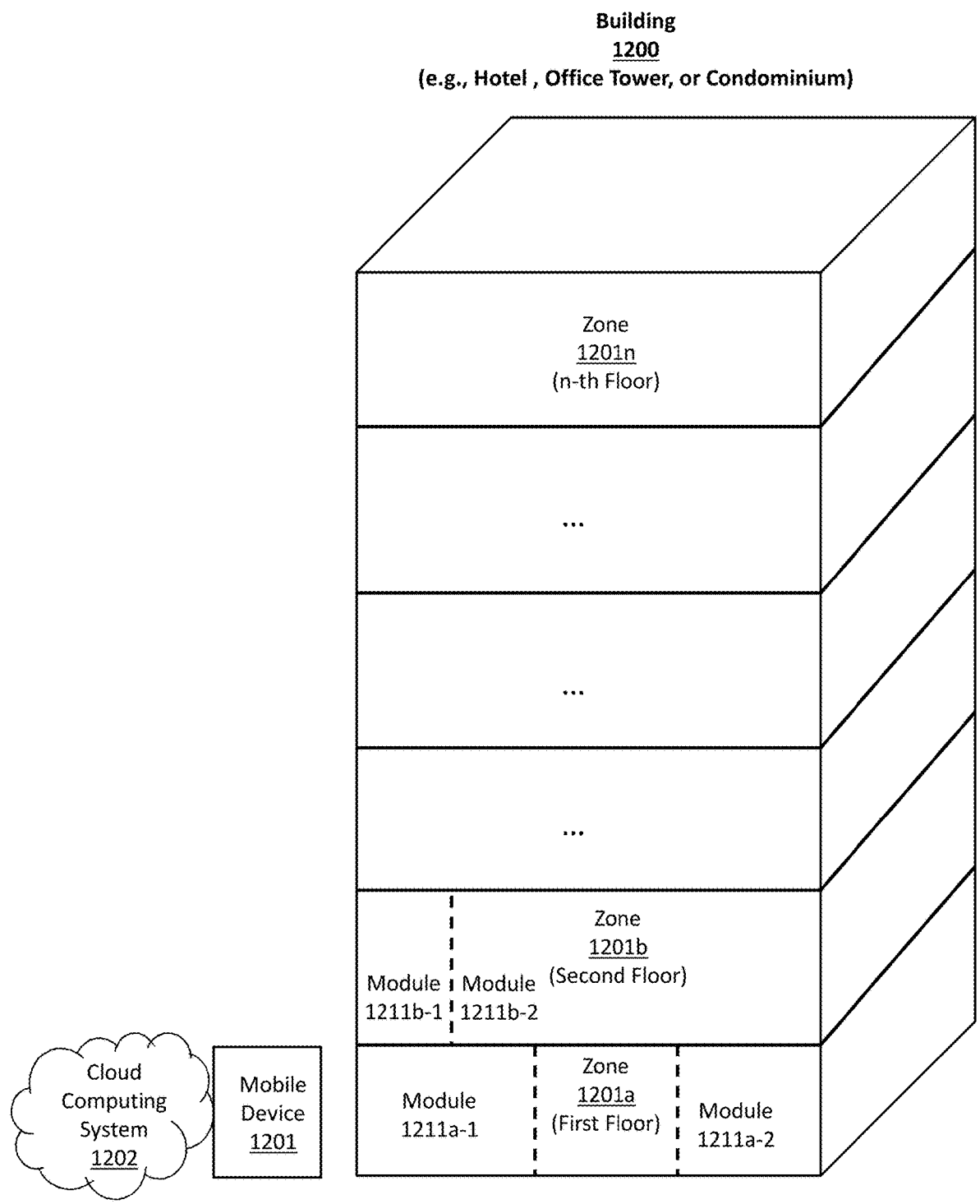
FIG. 12 depicts an embodiment of multiple zones, each zone comprising one or more modules of LED lighting systems.

FIG. 12 depicts one embodiment of zone control, module control, and entire system control. Here, building 1200 corresponds physically to the extent of the entire smart LED system. Building 1200 comprises n floors, with each floor representing a zone, and each zone comprising one or more modules. For example, the first floor is zone 1201a and comprises modules 1211a-1 and 1211a-2 (one of which, for example, might be in the building lobby and another of which might be in a restaurant). The second floor is zone 1201b and comprises modules 1211b-1 and 1211b-2. The n-th floor is zone 1201n, and in this instance, includes just one module such that the zone and module are co-extensive.

Mobile device 1201 or cloud computing system 1201 (implementing smart LED control module 800) can control the configuration of each zone, module, device, and/or the entirety of the system. Optionally, smart LED control module 800 can obtain information such as weather data and can adjust the lighting of building 1200 accordingly. For example, it might turn down the brightness of lights in the entire building on sunny days and increase the brightness on cloudy days. Smart LED control module 800 also can consider the position of the sun based on sensor data or weather data. For example, it might lower the brightness of lights in areas within building 1200 that are facing the sun in the morning and then increase the brightness of those lights in the afternoon when the sun is on the other side of building 1200.

Figure 13A:
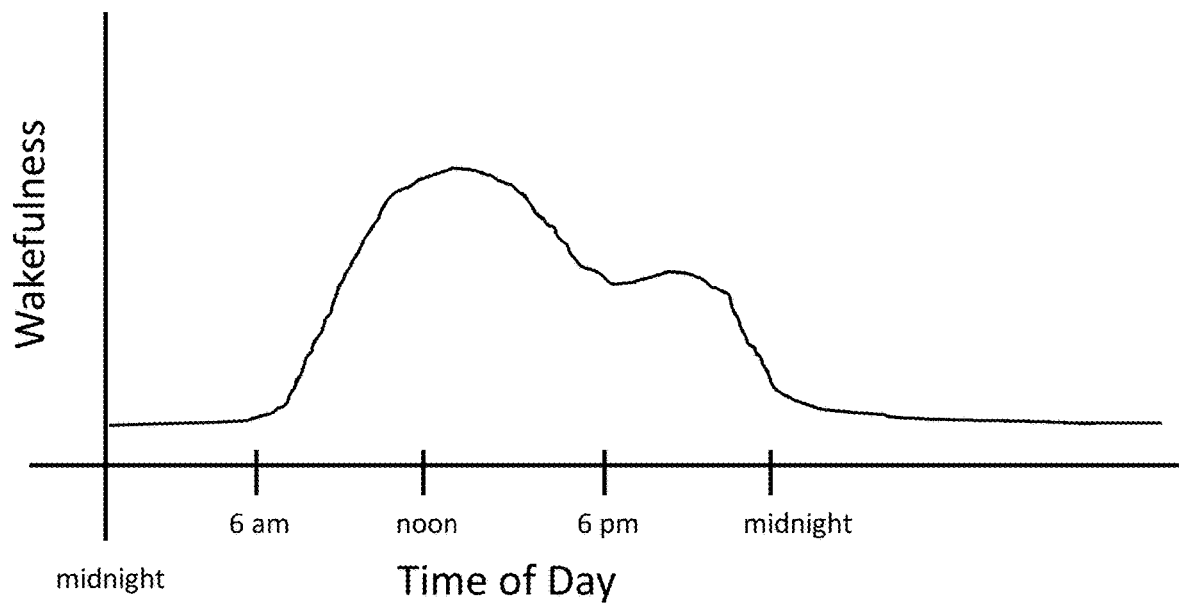
FIG. 13A depicts a type of circadian rhythm for a human being, showing wakefulness over time.
Figure 13B:
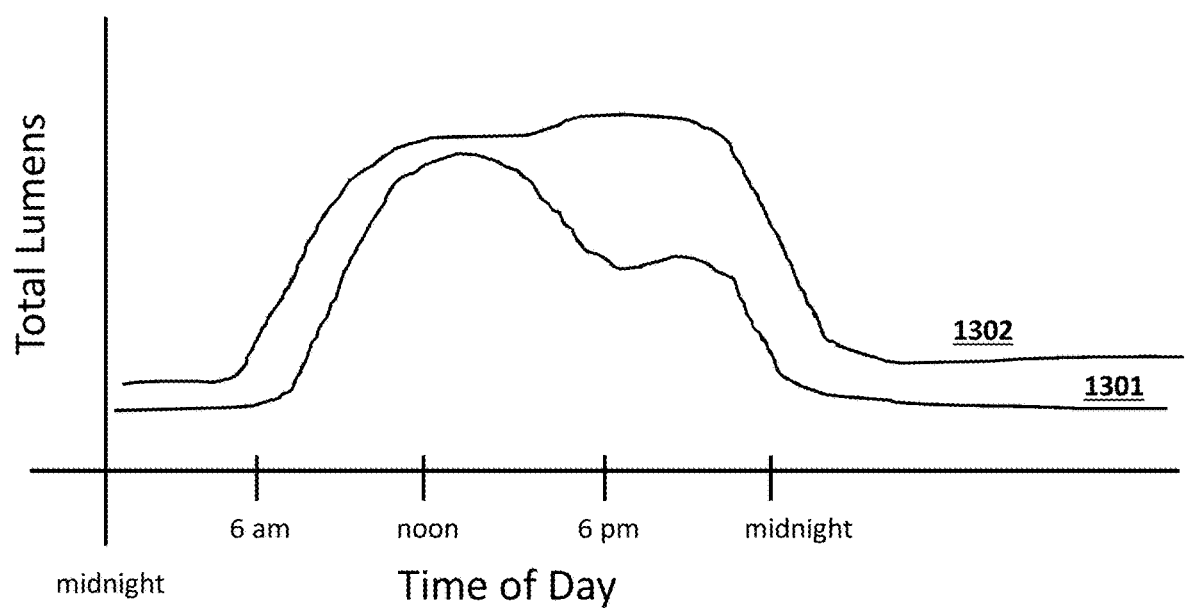
FIG. 13B depicts a first implementation of lighting control to mimic the circadian rhythm of FIG. 13A and a second implementation to partially mimic and partially counteract the circadian rhythm of FIG. 13A.

With reference to FIGS. 13A and 13B, additional detail regarding the circadian rhythm option within configuration selection 950 will now be provided. In general, a circadian rhythm refers to biological process that displays an endogenous, entrainable oscillation of about 24 hours. In human beings, a circadian rhythm often is colloquially called a "body clock" that affects a person's sleep and eating schedules.

FIG. 13A depicts an exemplary graph representing a circadian rhythm for a typical person's level of wakefulness during the course of a 24 hour period.

FIG. 13B depicts a first implementation 1301 of the circadian rhythm option within configuration selection 950. Here, the total lumens sensed within a particular zone or module or near a particular device is controlled to follow the graph shown in FIG. 13B. The brightness of implementation 1301 will mimic a typical Circadian Rhythm, such that lights will be brightest when a typical person (or a specific person in question) is most Wakeful.

FIG. 13B also depicts a second implementation 1302 of the circadian rhythm option within configuration selection 950. Here, lighting is used to counteract the circadian rhythm of a typical person or a specific person during certain periods of day. For example, the total lumens might be increased during periods of the day where the person is less wakeful but would prefer to be more wakeful (e.g., right after lunch, or towards the end of a business day). The same strategy can be used to counteract the change to a person's wakefulness that naturally occurs during winter months when periods of daylight are shorter or less intense, such that lighting is used to mimic summer sunlight.

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

It should be noted that, as used herein, the terms "over" and "on" both inclusively include "directly on" (no intermediate materials, elements or space disposed therebetween) and "indirectly on" (intermediate materials, elements or space disposed therebetween). Likewise, the term "adjacent" includes "directly adjacent" (no intermediate materials, elements or space disposed therebetween) and "indirectly adjacent" (intermediate materials, elements or space disposed there between), "mounted to" includes "directly mounted to" (no intermediate materials, elements or space disposed there between) and "indirectly mounted to" (intermediate materials, elements or spaced disposed there between), and "electrically coupled" includes "directly electrically coupled to" (no intermediate materials or elements there between that electrically connect the elements together) and "indirectly electrically coupled to" (intermediate materials or elements there between that electrically connect the elements together). For example, forming an element "over a substrate" can include forming the element directly on the substrate with no intermediate materials/elements therebetween, as well as forming the element indirectly on the substrate with one or more intermediate materials/elements there between.

What is claimed is:

1. A lighting system, comprising:
    a computing device comprising:
        a processing unit;
        an input device for receiving user input;
        a control module, executed by the processing unit, for generating control signals in response to the user input; and
        a wireless interface for transmitting the control signals over a wireless network; and
    one or more light systems, each light system comprising:
        a plurality of light-emitting diodes (LEDs);
        a wireless interface for communicating with the computing device over the wireless network to receive the control signals;
        a driver for providing current to the plurality of LEDs in response to the control signals; and
        a dimming control circuit for receiving the control signals and providing output signals to the driver in response to the control signals, wherein the driver provides current to the plurality of LEDs in response to the output signals;
    wherein the control module is configured to alter the brightness of light emitted by the one or more light systems to counteract a person's circadian rhythm.

2. The lighting system of claim 1, further comprising:
    an expansion port comprising a bus for connecting to one or more external devices.

3. The lighting system of claim 1, further comprising:
    one or more sensors for gathering environmental data and transmitting the environmental data to the control module.

4. The lighting system of claim 1, wherein the one or more light systems is a plurality of light systems that form a wireless mesh network.

5. The lighting system of claim 1, wherein the computing device is a mobile device and the control module is a software application executed by the computing device.

6. The lighting system of claim 5, wherein the input device is graphical user interface on a display of the computing device.

7. The lighting system of claim 1, wherein the input device is a smart speaker system located remotely from the one or more light systems and the user input comprises a voice command.

8. The lighting system of claim 1, wherein the control module is configured to alter the color of light emitted by the one or more light systems.

9. A lighting system, comprising:
    a smart speaker system for receiving voice commands;
    a cloud computing system coupled to the smart speaker system and comprising a control module for generating control signals in response to the voice commands and transmitting the control signals over a first network;
    a gateway for receiving the control signals over the first network and for transmitting the control signals over a second network, wherein the second network is a wireless network;
    one or more light systems, located remotely from the smart speaker system, each light system comprising:
        a plurality of light-emitting diodes (LEDs);
        a wireless interface for communicating with the gateway over the second network to receive the control signals; and
        a driver for providing current to the plurality of LEDs in response to the control signals.

10. The lighting system of claim 9, wherein each light system further comprises:
    a dimming control circuit for receiving the control signals and providing output signals to the driver in response to the control signals, wherein the driver provides current to the plurality of LEDs in response to the output signals.

11. The lighting system of claim 9, further comprising:
    an expansion port comprising a bus for connecting to one or more external devices.

12. The lighting system of claim 9, wherein the control module is configured to alter the brightness of light emitted by the one or more light systems based on a circadian rhythm.

13. The lighting system of claim 9, wherein the control module is configured to alter the color of light emitted by the one or more light systems.

14. The lighting system of claim 13, wherein the control module alters the settings of one or more light systems in response to the environmental data.

15. The lighting system of claim 14, wherein the settings comprise brightness settings.

16. The lighting system of claim 14, wherein the settings comprise color settings.

17. The lighting system of claim 9, wherein the one or more light systems is a plurality of light systems that form a wireless mesh network.

18. The lighting system of claim 9, further comprising:
one or more sensors for gathering environmental data and transmitting the environmental data to the control module.

* * * * *